United States Patent [19]

Horn et al.

[11] 4,286,959

[45] Sep. 1, 1981

[54] DISPERSE DYE FORMULATIONS

[75] Inventors: Dieter Horn, Heidelberg; Ewald Daubach, Ludwigshafen; Erwin Hahn, Heidelberg; Herbert Uhrig, Worms; Richard Hoene, Heidelberg; Herbert Naarmann, Wattenheim, all of Fed. Rep. of Germany

[73] Assignee: BASF Aktiengesellschaft, Ludwigshafen, Fed. Rep. of Germany

[21] Appl. No.: 18,765

[22] Filed: Mar. 8, 1979

[51] Int. Cl.$^3$ .................... C09B 67/00; C09B 67/22; C09B 67/38

[52] U.S. Cl. ........................ 8/524; 8/526; 8/550; 8/553; 8/527; 260/42.21

[58] Field of Search .................. 8/79, 524; 260/42.21

[56] References Cited

U.S. PATENT DOCUMENTS

| | | | |
|---|---|---|---|
| 3,454,347 | 7/1969 | Leimbacher | 8/79 |
| 3,669,922 | 6/1972 | Bartsch et al. | 8/79 |
| 3,691,090 | 9/1972 | Kitajima et al. | 8/526 |
| 3,841,888 | 10/1974 | Belde et al. | 106/308 |
| 3,844,806 | 10/1974 | Wegmann et al. | 260/42.21 |
| 3,891,570 | 6/1975 | Fukushima et al. | 8/526 |
| 3,947,287 | 3/1976 | Belde et al. | 106/306 |
| 3,960,486 | 6/1976 | Daubach et al. | 8/79 |
| 3,967,922 | 7/1976 | Wolf et al. | 8/79 |
| 4,058,480 | 11/1977 | Lohmann et al. | 8/524 |
| 4,148,779 | 4/1979 | Blackwell et al. | 8/79 |
| 4,202,815 | 5/1980 | Wegmann | 8/526 |

FOREIGN PATENT DOCUMENTS

| | | |
|---|---|---|
| 2156603 | 5/1973 | Fed. Rep. of Germany . |
| 2236906 | 2/1974 | Fed. Rep. of Germany . |
| 2342659 | 1/1975 | Fed. Rep. of Germany . |
| 2521898 | 12/1975 | Fed. Rep. of Germany . |
| 2521960 | 4/1976 | Fed. Rep. of Germany . |
| 2557563 | 6/1977 | Fed. Rep. of Germany . |
| 2628445 | 1/1978 | Fed. Rep. of Germany ............... 8/79 |
| 2243994 | 9/1973 | France ............................................. 8/79 |
| 49-12879 | 3/1974 | Japan ............................................... 8/79 |
| 7006385 | 11/1970 | Netherlands .................................. 8/79 |
| 1446735 | 8/1976 | United Kingdom . |
| 1508215 | 4/1978 | United Kingdom . |
| 1513672 | 6/1978 | United Kingdom . |
| 1513671 | 7/1978 | United Kingdom . |

Primary Examiner—Joseph L. Schofer
Assistant Examiner—Maria Parrish Tungol
Attorney, Agent, or Firm—Oblon, Fisher, Spivak, McClelland & Maier

[57] ABSTRACT

The invention seeks to provide a free-flowing formulation of one or more disperse dyes, with which packages can be dyed homogeneously by the HT process without filtering out of the dye, and which is suitable for the thermosol dyeing process. According to the invention such a formulation comprises one or more disperse dyes (a) enclosed in a matrix of one or more polymers (b) which are soluble, or colloidally soluble, both in water and in an organic solvent, in the form of a solid solution in a state of molecular dispersion or of extremely fine subdivision so that in an X-ray spectrum the dye appears amorphous.

The formulations may contain additional assistants conventionally present when dyeing hydrophobic fibers. The formulations contain the disperse dye in an extremely fine state of subdivision. Because of the latter, the formulations give level package dyeings, without filtration of the dye, and very level dyeings when used by the thermofixing process.

12 Claims, No Drawings

DISPERSE DYE FORMULATIONS

The present application relates to free-flowing formulations of disperse dyes, their preparation and their use for dyeing synthetic fibers.

Disperse dyes are used, in the various continuous and batchwise dyeing methods, in two basically different forms. As a rule, the dyes are introduced into the dyebath in the form of a fine dispersion. The fineness of subdivision of the dyes is a critical factor in their use. Subdivision corresponding to a particle size range of from 0.1 to 5.0 microns is achieved by mechanically comminuting the dyes, obtained from their synthesis, by conventional methods, for example in stirred ball mills or kneaders in the presence of surfactants (dispersants). The function of the surfactants added is, on the one hand, to accelerate the mechanical comminution process and, on the other hand, to maintain the state of fine subdivision of the dyes in the dyebath, which state, when achieved, is thermodynamically unstable.

Mechanical comminution methods entail expensive apparatus and high expenditure of energy, and give low space-time yields. The lower limit of particle size achievable by mechanical comminution methods is about 0.1 $\mu$m.

The use of the disperse dyes is fundamentally different in the process described in German Laid-Open Application DOS No. 2,342,659. In this process, the dyes are released from a previously dyed water-insoluble polymer material, which has a lower affinity for the dye than has the textile material to be dyed, and which acts as a dye depot, into the dye liquor, from which the dyes then go onto the fibers to be dyed.

As a result of short-cycle dyeing processes, the fineness of subdivision and stability of disperse dyes in dyeing liquors have in recent years had to conform with ever more stringent requirements. This applies particularly to package dyeing at 120° to 140° C. (HT dyeing processes) and to continuous dry dyeing processes in which the dyes are fixed to the fibers by heating at from 180° to 220° C. However, dye dispersions of the type described are thermodynamically unstable and tend, under dyeing conditions, in particular under HT dyeing conditions, to recrystallize or agglomerate so as to form coarser particles. This interferes with the dyeing process, through filtering out of the dye, and hence gives unsatisfactory, uneven dyeings. Even with additional amounts of dispersants selected from the groups of condensation products of naphthalenesulfonic acid and formaldehyde, condensation products of cresol or phenol and/or phenolsulfonic acids with formaldehyde and/or their sulfomethylation products, or ligninsulfonates, satisfactory dyeings frequently fail to be achieved under the severe conditions of HT dyeing.

It is true that in the process described in German Laid-Open Application DOS No. 2,342,659, the disadvantages which occur when using disperse dye liquors are avoided, but instead other disadvantages become more prominent. Thus, the dye formulations described in the said DOS, which are used in the form of water-insoluble macroscopic polymeric moldings, cannot, for example, be employed in padding processes, such as are conventionally involved in continuous dyeing processes. The use of hydrophobic and hence water-insoluble polymeric substances as dye carriers has the further disadvantage that the polymer must be selected according to the affinity of the dye or dyes for the synthetic fibers, which are also hydrophobic, since otherwise, due to the unfavorable Nernst distribution coefficient, the dye yield is adversely affected and the exhaustion of the dye formulation is unsatisfactory. The dye formulations described in the above DOS furthermore require dyeing equipment of special design, in which it is possible to separate the coarse-particled exhausted dye formulation from the textile goods after dyeing.

The present invention seeks to provide a free-flowing formulation of one or more disperse dyes, with which packages can be dyed homogeneously by the HT process without filtering out of dye, and which is suitable for the thermosol dyeing process.

We have found that dyebaths which are outstandingly suitable for the above processes are obtained if the baths are prepared with a free-flowing dye formulation of one or more disperse dyes for dyeing hydrophobic fiber material from an aqueous liquor, which formulation comprises (a) one or more disperse dyes, and
(b) one or more polymers which are soluble, or colloidally soluble, both in water at a pH of from 1 to 9 and in an organic solvent, (a) being enclosed in a matrix of
(b) in the form of a solid solution in a state of molecular dispersion of extremely fine subdivision so that in an X-ray spectrum the dyes appear amorphous.

The formulation of the invention has been obtained from a solution in such an organic solvent which contains (a) and (b), with (a) being present in the solution in a state of molecular dispersion, by removing the solvent. In addition to (a) and (b), the formulation may contain one or more assistants (c) as used for dyeing hydrophobic fibers from an aqueous liquor. In that case, the solution from which the formulation is prepared contains (c) in addition to (a) and (b). The organic solvent for the solution from which the formulation is prepared may, if desired, be a mixture of compounds in which (b) is soluble or colloidally soluble.

The dye formulations according to the invention contain the dye (a) in a state of molecular dispersion or extremely fine subdivision, so that in an X-ray spectrum the dye appears amorphous.

The novel dye formulations dissolve spontaneously, on introduction into the dyebath, to form a finely dispersed hydrosol having a mean particle size of <0.1 $\mu$m. This fine state of subdivision in the dispersion (ie. in the dye-bath), which is ideal for the above dyeing processes, cannot be achieved by conventional mechanical comminution processes. In the dye formulations according to the invention, the extremely fine state of subdivision is achieved by the fact that during preparation of the formulation, the dyes are enclosed in the polymer matrix, in a state of molecular dispersion or of extremely fine subdivision, in the form of a solid solution.

The dye formulations according to the invention can in principle be used in all conventional dyeing processes. However, they offer particular advantages in dyeing synthetic fibers by the HT process, since, due to the extremely fine state of subdivision of the dyes in the dyebath, satisfactory level package dyeings, without filtering out of dye, are obtained. Satisfactory level dyeings are also obtained by the thermosol process when using the dye formulations according to the invention.

Disperse dyes (a) for the formulations according to the invention include monoazo dyes, quinophthalone dyes and dyes of other categories of compounds which are sparingly soluble in water and go onto synthetic fibers, preferably polyester fibers, from an aqueous liquor, or mixtures of such dyes.

The dye content of the novel formulations is generally from 5 to 40, preferably from 10 to 30, percent by weight based on the formulation.

In principle, suitable polymers (b) which are soluble in water and in at least one organic solvent are all those which conform to the following requirements:

1. They must dissolve in the dyebaths used for dyeing hydrophobic fibers, and under the conditions prevailing in such baths, but it is immaterial whether the polymer dissolves in a state of molecular dispersion or to form a colloidal solution, i.e. the polymer should be soluble or colloidally soluble in water at a pH of from 1 to 9, preferably from 4 to 7.

2. The softening point is preferably above 25° C., and in particular above 50° C.

3. The polymer must be soluble in organic solvents, the molecular weight or degree of crosslinking of the polymer being preferably selected so that solutions of at least 3 percent strength by weight are still pourable and pumpable, and can be spray-dried.

Both water-soluble homopolymers and water-soluble copolymers may be used as (b) in the formulations according to the invention.

Examples of water-soluble polymers are poly-N-pyrrolidone, poly-N-vinylimidazoles, poly-N-vinylcaprolactam, polyacrylamide or polymethacrylamide, which may be partially hydrolyzed, and their water-soluble N-$C_1$-$C_4$-alkyl derivatives, polyvinylpyridines, polymers of monomers containing primary, secondary or tertiary basic nitrogen, such as dimethylaminoethyl methacrylate, diethylaminoethyl acrylate and N-(dimethylaminopropyl)-acrylamide and copolymers of these monomers, which polymers and copolymers may or may not be quaternized by means of $C_1$-$C_4$-alkylating agents or epoxides, and copolymers of acrylic acid with salts of vinylsulfonic acid, for example the alkali metal salts, eg. the sodium or potassium salt.

Further suitable copolymers are those which in addition to hydrophilic groups contain hydrophobic groups, the ratio of the two groups being selected so that the copolymer is water-soluble.

Examples of hydrophilic comonomers suitable for the preparation of such copolymers are N-vinyllactams, eg. N-vinylpyrrolidone and N-vinylcaprolactam; N-vinylimidazoles, N-vinylimidazolines, N-vinylureas and N-vinylurethanes; hydroxy-$C_2$-$C_4$-alkyl acrylates and methacrylates; allyl alcohol and methallyl alcohol; monoallylamines, diallylamines and their salts; acrylamide, methacrylamide and their N-$C_1$-$C_4$-alkyl derivatives, eg. N-methylacrylamide and N-tert.-butylacrylamide; methyl vinyl ether; olefinically unsaturated compounds containing sulfonic acid groups, eg. vinylsulfonic acid, acrylamido-N-propanesulfonic acid, styrenesulfonic acid and their salts; olefinically unsaturated compounds, containing epoxy groups, which are converted by hydrolysis into compounds containing hydroxyl groups, eg. allyl glycidyl ether, glycidyl acrylate and glycidyl methacrylate; olefinically unsaturated compounds which contain a dicarboxylic acid anhydride group and which, after polymerization, can be converted to monoamides, imides or monoesters, eg. maleic anhydride, itaconic anhydride and tetrahydrophthalic anhydride; olefinally unsaturated compounds containing primary, secondary or tertiary amino groups, and their salts, such as amino-$C_2$-$C_4$-alkyl acrylates and methacrylates and their N-$C_1$-$C_4$-mono- and N,N-$C_1$-$C_4$-dialkyl derivatives, eg. dimethylaminoethyl acrylate and methacrylate, diethylaminoethyl acrylate and methacrylate and dimethylaminopropylacrylamide and -methacrylamide; monoesters and diesters of maleic acid and itaconic acid with dimethylaminoethanol and diethylaminoethanol; amides or imides of maleic acid and itaconic acid with dimethylaminopropylamine and diethylaminopropylamine; and olefinically unsaturated carboxylic acids, eg. acrylic acid, methacrylic acid, crotonic acid, itaconic acid and maleic acid.

The conventional compounds may be used as comonomers with hydrophobic groups. Specific examples are $C_2$-$C_4$-alkyl vinyl ethers, eg. ethyl vinyl ether and butyl vinyl ether; vinyl esters of carboxylic acids of 2 to 14 carbon atoms, eg. vinyl acetate, vinyl propionate, vinyl butyrate and vinyl versatate, it being possible for some of the ester groups in the polymer to be hydrolyzed; $C_1$-$C_{20}$-alkyl acrylates and methacrylates, eg. methyl, ethyl, isobutyl and tert.-butyl acrylates and methacrylates; vinyl chloride and vinylidene chloride; acrylonitrile and methacrylonitrile; styrene, $\alpha$-methylstyrene and indene; and 1-olefins of up to 20 carbon atoms, eg. isobutylene, diisobutylene, pent-1-ene, hex-1-ene and ethylene.

Copolymers which are soluble in an aqueous medium at a pH of from 1 to 9 as a rule contain 15 or more, preferably 20 or more, percent by weight of one or more comonomers possessing hydrophilic groups, the minimum amount depending on the nature of the hydrophobic comonomer or comonomers, on the molecular weight of the copolymer and, where relevant, on its degree of crosslinking.

Water-soluble polymers and copolymers can also be obtained by reactions involving the side groups of the polymer chain. For example, polymers containing ester or amide groups, eg. polyvinyl acetate or polyacrylamide, can be hydrolyzed to give water-soluble polymers. Furthermore, a Mannich reaction of polymers containing carboxamide groups, eg. polyacrylamide with aldehydes and amines, and the quaternization of polymers or copolymers, containing primary, secondary or tertiary amino groups, with protonic acids, $C_1$-$C_4$-alkylating agents or epoxides, also yield water-soluble polymers and copolymers.

The preparation of the water-soluble polymers and copolymers may be carried out in the conventional manner by polymerization or reaction in solution, in mass, in emulsion or in suspension, preferably by free radical polymerization.

In addition to the above polymers, which are essentially obtained by free radical polymerization, it is also possible to use poly-$C_2$-$C_3$-alkylene oxides and polymers which may contain polyethylene oxide units, the molecular weights being about 1,000 or, preferably, above this figure. Such copolymers are obtained, for example, by anionic polymerization or copolymerization or block copolymerization of ethylene oxide and propylene oxide, by block copolymerization of ethylene oxide and styrene, vinylpyridine or methyl methacrylate, or by reaction of ethylene oxides with polymers or copolymers containing carboxylic acid, carboxylic acid amide, amino, hydroxyl and/or mercapto groups.

Further suitable polymers are those which are obtained by block copolymerization of ethylene oxide or propylene oxide and ethylene oxide with $C_2$-$C_4$-alkylenediamines and polyalkylenepolyamines or polyols (German Laid-Open Applications DOS Nos. 2,156,603 and 2,236,906), and their reaction products with sulfur trioxide, chlorosulfonic acid or sulfopropionic anhydride, namely polymers containing sulfonic acid groups, or their salts (German Laid-Open Application DOS No. 2,557,563), the molecular weight of these polymers being greater than 1,000. Further suitable polymers are those which contain polyethyleneimine units, and which may or may not be alkylated or quaternized.

Examples of suitable alkylating agents and quaternizing agents for these and the previously mentioned alkylations and quaternizations are dialkyl sulfates, eg. dimethyl sulfate, diethyl sulfate and dipropyl sulfate, $C_1$-$C_4$-esters of alkylsulfonic acids and arylsulfonic acids, eg. methyl, ethyl, propyl and butyl methanesulfonate, benzenesulfonate and toluenesulfonate, benzyl halides, eg. benzyl chloride and benzyl bromide, alkyl halides, eg. methyl chloride, methyl bromide, ethyl chloride and ethyl bromide; and epoxides, eg. ethylene oxide, propylene oxide, styrene oxide, 1,2-epoxybutane, glycidol, alkyl glycidyl ethers and phenyl glycidyl ether.

Further suitable polymers are those which are obtained by a poly-Menschutkin reaction, eg. from a diamine and a dihalide, as described in German Laid-Open Applications DOS Nos. 2,521,898 and 2,521,960. In addition to the above copolymers, modified natural polymers may also be used, for example modified cellulose, eg. methylcellulose, hydroxypropylcellulose, hydroxyethylcellulose and carboxymethylcellulose and shellac.

For economic and technical reasons, the following water-soluble polymers (b) are preferred: poly-N-vinylpyrrolidone and copolymers containing N-vinylpyrrolidone; polyacrylates, polymethacrylates, polyacrylamides and polymethacrylamides containing basic primary, secondary, tertiary or quaternary amino groups, or mixtures of these; copolymers obtained from monomers containing basic primary, secondary, tertiary or quaternary amino groups, eg. acrylates, methacrylates, acrylamides and methacrylamides carrying such groups, and hydrophobic comonomers, with or without other comonomers containing hydrophilic groups; polyethylene oxide and block copolymers (polyalkylene oxide polymers) which contain ethylene oxide, with or without propylene oxide, with molecular weights greater than 1,000, or mixtures of such polymers. The amount of (b) is in general from 95 to 40, preferably from 50 to 90, percent by weight, based on the formulation.

Examples of further assistants (c) used for dyeing hydrophobic fiber material are dispersants, eg. ligninsulfonates, condensation products of naphthalenesulfonic acid and formaldehyde, and other anionic dispersants, non-ionic dispersants with molecular weights of <1,000, wetting agents, pH regulators, eg. buffers, and additives which stabilize the state of fine subdivision of the dye, or mixtures of such assistants. The amount of (c) is generally from 0 to 50, preferably from 0 to 30, percent by weight, based on the formulation (a+b+c). A limit is imposed on the amount of non-ionic dispersant by the fact that the isolated formulation is pulverulent and must remain in this condition on storage. The maximum amount of the above non-ionic dispersants should therefore as a rule be 20 percent by weight, based on the formulation.

The novel formulations are obtained from solutions, which comprise components (a) and (b), with or without (c), dissolved in one or more organic compounds in which (b) is soluble or colloidally soluble, by removing the solvent or solvents.

The organic solution may be prepared directly by mixing the solutions of components (a) and (b), with or without (c), or by dissolving a mixture of (a) and (b), with or without (c).

If the components are dissolved separately, it is possible to use solvents which readily dissolve the individual components. Using such stock solutions, a variety of formulations can be prepared by mixing, followed by removal of the solvents.

The dyes (a) may be used in the form of the moist press cake, or preferably in a dried form, for preparing the solutions. Advantageously, the process of solution is accelerated by warming. In the former case, the water must be removed from the solution. If the solvent is immiscible with water, the latter can be removed by decanting or by azeotropic distillation. In other cases, the water must be removed by heating at from 100° to 150° C. In that case, removal of the water can be carried out simultaneously with the process of solution.

The solution of the polymer (b) with or without the further assistant or assistants (c) may be obtained in the conventional manner, if necessary by heating the components, in a good organic solvent, at up to about 150° C. If polymers (b) obtained by solution polymerization are used, these polymers can be employed in the form of the solution obtained from their preparation.

Examples of suitable organic solvents are aliphatic carboxylic acids 1 to 3 carbon atoms, their amides, their mono-$C_1$-$C_4$-alkylamides and di-$C_1$-$C_4$-alkylamides, aliphatic and aromatic chlorohydrocarbons, alcohols of 1 to 5 carbon atoms, ketones of 3 to 6 carbon atoms, aromatic hydrocarbons, N-alkylated lactams and mixtures of these. Because of their good solvent power, preferred solvents are methanol, ethanol, formic acid, formamide, dimethylformamide, dimethylpropionamide, N-methylpyrrolidone, methylene chloride, chloroform, 1,2-dichloroethane, chlorobenzene, toluene, xylene, methyl ethyl ketone, methyl isopropyl ketone, methyl isobutyl ketone and mixtures of these.

Advantageously, the solvent or solvents is or are removed by spray drying. The solutions can also be freed from solvent in a fluidized bed dryer. In the latter case, a granular formulation with particle sizes of from 0.1 to 5 mm is obtained.

The formulations according to the present invention can be used in the same manner as the prior art pulverulent formulations, which contain disperse dyes and non-ionic or anionic dispersants or mixtures of these.

The Examples which follow further illustrate the invention. Parts and percentages are by weight. The mean molecular weight is abbreviated $\overline{M}$.

EXAMPLE 1

90 parts of polyvinylpyrrolidone ($\overline{M}$. 5,000) and 10 parts of the dye of the formula

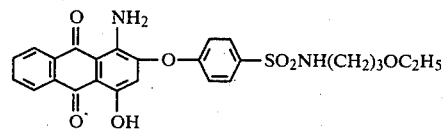

are dissolved in 400 parts of dimethylformamide (DMF) and the solution, in which the polymer is in a state of molecular dispersion, is dried in a spray drier (gas entry temperature 180° C., gas exit temperature 80° C.). A pulverulent, storage-stable formulation is obtained, which on introduction into an aqueous dyebath, which may or may not contain other conventional dyeing assistants, dissolves instantly to form an extremely finely divided dye hydrosol. Particle size analysis of the dye liquor by the quasi-elastic laser light scattering method (B. Chu "Laser Light Scattering,", Academic Press, New York 1974), indicates a mean particle size of <0.1 μm.

Accordingly, these dye liquors give a satisfactory result in the suction filter test (H. Leube and H. Uhrig, Textilveredlung 9 (1974), 101).

This dye formulation gives dyebaths in which packages can be dyed homogeneously by the HT process, and no filtering out of the dye takes place.

Padding liquors prepared from the formulation give satisfactory, level and rub-fast dyeings on polyester fabrics by the thermosol process.

EXAMPLES 2 TO 7

The procedure described in Example 1 is followed, but using the polymers shown in Table 1.

| Example | Polymer |
|---|---|
| 2 | Polyvinylpyrrolidone, $\overline{M}_n$ 40,000 |
| 3 | Copolymer of equal parts of N-vinylpyrrolidone and vinyl acetate |
| 4 | Block copolymer of propylene oxide and ethylene oxide (molar ratio 1:4), $\overline{M}$ 16,000 |
| 5 | Copolymer of 30% of styrene, 30% of acrylic acid and 40% of diethylaminoethyl acrylate |
| 6 | Copolymer of 40% of styrene, 20% of acrylic acid and 40% of dimethylaminoethyl methacrylate |
| 7 | Reaction product of ethylenediamine with propylene oxide and ethylene oxide (molar ratio 1:1), $\overline{M}$ 3,000 |

Spray drying of the solutions gives pulverulent formulations which are storage-stable and which when introduced into water and stirred dissolve and disperse rapidly. The formulations obtained have the same advantageous properties as those obtained as described in Example 1.

EXAMPLE 8

20 parts of the polymer from Example 4, 70 parts of the polymer from Example 3 and 10 parts of the dye from Example 1 are dissolved in 400 parts of DMF and the dye formulation is isolated from the homogeneous solution by spraying into a fluidized bed dryer. A free-flowing, dust-free storage-stable granular material is obtained, which when introduced into water dissolves rapidly. Dyebaths and padding liquors prepared from the formulation, with or without addition of conventional dyeing assistants, give satisfactory package dyeings and thermosol dyeings on polyester fibers, due to the extremely fine state of subdivision of the dye.

EXAMPLE 9

80 parts of the polymer from Example 1 and 20 parts of the dye of the formula

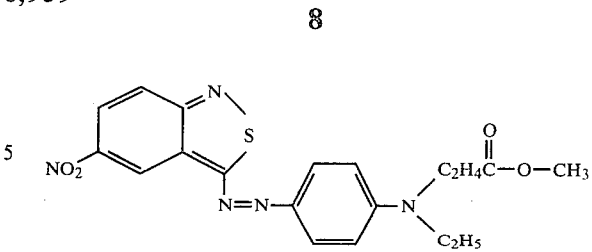

are dissolved in 400 parts of DMF and the formulation is isolated from the solution by spray drying.

The resulting pulverulent formulation is storage-stable and dissolves very rapidly on introduction into water. Dyebaths prepared using this formulation, when employed for cheese dyeing by the HT process, give uniformly dyed fibers, without filtering out of dye. Package dyeing of texturized polyester fiber material also results in homogeneous dyeing throughout the package. When fixed by the thermosol process, the dyeings obtained with the above formulation are level and fast.

EXAMPLE 10

60 parts of the polymer from Example 1, 20 parts of the polymer from Example 7 and 20 parts of the dye of the formula

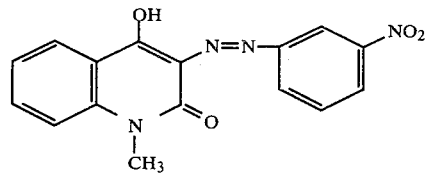

are dissolved in 400 parts of DMF. The formulation is isolated by drying in a spray tower. The product is storage-stable and gives satisfactory package dyeings and level thermosol dyeings.

If the formulation is, instead, isolated by spraying into a fluidized bed dryer, a dust-free granular product is obtained, which exhibits the same technological properties as the powder obtained by spray drying.

EXAMPLE 11

10 parts of the dye mentioned in Example 1, 50 parts of the polymer from Example 3 and 20 parts of the polymer from Example 4 are dissolved in 400 parts of DMF. To this solution is added a solution of 10 parts of sodium lignin-sulfonate in 100 parts of formamide. The formulation is isolated in a solid form from the combined solution by spraying the latter into a fluidized bed dryer. The granular formulation obtained is storage-stable, and when introduced into water dissolves instantly to form a very finely disperse dye hydrosol. The dye particles in the aqueous dispersion have a size of less than 0.1 μm. Dyebaths prepared from the formulation, when used in the HT process, give packages which are dyed homogeneously throughout the package, without filtering out of dye. Padding liquors prepared from the formulation give level and fast thermosol dyeings on polyester.

A formulation with equally good technological properties is obtained if the solution is dried in a spray tower to give a powder.

EXAMPLE 12

5 parts of the dye of the formula

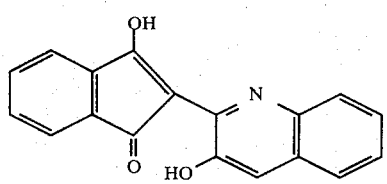

are dissolved in 700 parts of hot DMF. 45 parts of the polymer from Example 5, in 45 parts of DMF, are added and the formulation is isolated from the combined solution by spray drying. The formulation obtained is storage-stable and when introduced into water, which may additionally contain conventional dyeing assistants, at pH <7 gives dyeing or padding liquors which give satisfactory package dyeings and level thermosol dyeings.

On drying the solution in a fluidized bed dryer, the formulation is obtained in the form of a granular material which exhibits the same advantageous properties as the formulation obtained by spray drying.

EXAMPLES 13 TO 17

The procedure followed is as described in Example 9, except that 80 parts of one of the polymers shown in the Table below are used.

| Example | Polymer |
| --- | --- |
| 13 | Polyvinylpyrrolidone, $\overline{M}$ 40,000 |
| 14 | Copolymer of equal parts of N-vinylpyrrolidone and vinyl acetate |
| 15 | Block copolymer of propylene oxide and ethylene oxide (molar ratio 1:4), $\overline{M}$ 16,000 |
| 16 | Copolymer of 30% of styrene, 30% of acrylic acid and 40% of diethylaminoethyl acrylate |
| 17 | Copolymer of 40% of styrene, 20% of acrylic acid and 40% of dimethylaminoethyl acrylate. |

Spray drying gives pulverulent, storage-stable formulations which exhibit the same properties as the formulation obtained according to Example 9.

We claim:

1. A free-flowing formulation of one or more disperse dyes for dyeing hydrophobic fiber material from an aqueous liquor, which formulation comprises
  (a) one or more disperse dyes, and
  (b) one or more polymers which are soluble, or colloidally soluble, both in water at a pH of from 1 to 9 and in an organic solvent, said polymers being prepared by free radical or ionic polymerization or by a poly-Menschutkin reaction,
  (a) being enclosed in a matrix of
  (b) in the form of a solid solution in a state of molecular dispersion of extremely find subdivision so that in an X-ray diffraction pattern the dyes appear amorphous, said formulation having been prepared from a solution in said organic solvent which contains (a) and (b), with (a) being present in the solution in a state of molecular dispersion, by removing the solvent.

2. A free-flowing formulation as claimed in claim 1 which in addition to (a) and (b) contains (c) further assistants used for dyeing hydrophobic fiber material from an aqueous liquor.

3. A free-flowing formulation as claimed in claim 2 which formulation comprises, based on (a+b+c),
  (a) from 5 to 40% by weight of one or more finely divided disperse dyes,
  (b) from 40 to 95% by weight of one or more polymers which are soluble or colloidally soluble in water and organic solvents, and
  (c) from 0 to 50% by weight of other assistants conventionally used for dyeing hydrophobic fiber material from an aqueous liquor.

4. A formulation as claimed in claim 3, which comprises from 10 to 30% by weight of (a), from 50 to 90% by weight of (b) and from 0 to 30% by weight of (c).

5. A formulation as claimed in claim 3, wherein (c) is an anionic dispersant, a non-ionic dispersant of molecular weight <1,000, a wetting agent, a pH regulator, an additive which stabilizes the fine state of subdivision of the dye, or a mixture of these.

6. A formulation as claimed in claim 1, wherein (b) is poly-N-vinylpyrrolidone, poly-N-vinylimidazole, poly-N-vinylcaprolactam, polyacrylamide, polymethacrylamide, partially hydrolyzed polyacrylamide, partially hydrolyzed polymethacrylamide, an N-$C_1$-$C_4$-alkyl derivative of polyacrylamide or polymethacrylamide, a polymer of a monomer containing primary, secondary or tertiary basic nitrogen, which polymer can be quaternized with a $C_1$-$C_4$-alkylating agent or an epoxide, a copolymer of acrylic acid and vinylsulfonic acid in the form of an alkali metal salt, or a copolymer which comprises, based on the copolymer, about 15% by weight, or more, of units of a monomer containing hydrophilic groups and up to about 85% by weight of units of a hydrophobic monomer.

7. A formulation as claimed in claim 1, wherein (b) is a water-soluble copolymer which has been synthesized from ($\alpha$) N-vinylpyrrolidone, N-vinylcaprolactam, a N-vinylimidazole, a N-vinylimisazoline, a N-vinylurea, a N-vinylurethane, a hydroxy-$C_2C_4$-alkyl acrylate or methacrylate, allyl alochol, methallyl alcohol, allylamine, diallylamine (it also being possible for the amines to be in the form of their salts), acrylamide, methacrulamide, N-$C_1$-$C_4$-alkylacrylamide or -methacrylamide, methyl vinyl ether, vinylsulfonic acid, acrylamido-N-propanesulfonic acid, styrenesulfonic acid, allyl glycidyl ether, glycidyl acrylate glycidyl methacrylate, maleic anhydride, itaconic anhydride tetrahydrophthalic anhydride, an amino-$C_2$-$C_4$-alkyl acrylate or methacrylate or a mono-N- or di-N,N-$C_1$-$C_4$-alkyl derivative thereof, a monoester or diester of maleic acid or itaconic acid with dimethylaminoethanol or diethylaminoethanol, an amide or imide or maleic acid or itaconic acid with N,N-dimethylaminopropylamine or N,N-diethylaminopropylamine, or acrylic acid, methacrylic acid, crotonic acid, itaconic acid or maleic acid, or a mixture of these, as the hydrophilic comonomer and
  ($\beta$) a $C_2$-$C_4$-alkyl vinyl ether, a vinyl ester of a $C_2$-$C_{14}$-carboxylic acid, a $C_1$-$C_{20}$-alkyl acrylate or methacrylate, vinyl chloride, vinylidene chloride, acrylonitrile, methacrylonitrile, styrene, $\alpha$-methylstyrene, indene, a 1-olefin of 2 to 20 carbon atoms or a mixture of these as the hydrophobic comonomer, the proportion of ($\alpha$), based on the copolymer, being 20% by weight or more, with the proviso that when a hydrophilic comonomer is allyl glycidyl ether, glycidyl acrylate, or glycidyl methacrylate, the glycidyl groups, after copolymerization, are converted to hydroxyl groups by hydrolysis, and that when a hydrophylic comonomer is maleic anhydride, itaconic anhydride, or tetrahydrophthalic anhydride, the anhydride groups, after copolymerization are converted to monoamides, imides, or monoesters.

8. A formulation as claimed in claim 1, wherein (b) is a block copolymer of ethylene oxide and propylene oxide, a block copolymer of ethylene oxide and styrene, vinylpyridine or methyl methacrylate, or a reaction product of a $C_2$–$C_4$-alkylenediamine, polyalkylenepolyamine or polyol with ethylene oxide, or with propylene oxide and ethylene oxide, the polymeric reaction product having a mean molecular weight of 1,000 or more.

9. A formulation as claimed in claim 1, wherein (b) is poly-N-vinylpyrrolidone, a copolymer containing N-vinylpyrrolidone, a polyacrylate, polymethacrylate, polyacrylamide or polymethacrylamide containing basic primary, secondary, tertiary or quaternary amino groups, or a mixture of these; a copolymer synthesized from acrylates, methacrylates, acrylamides, methacrylamides or mixtures thereof, containing basic primary, secondary, tertiary or quaternary amino groups, and a hydrophobic comonomer and optionally from additional comonomers containing hydrophilic groups; polyethylene oxide, or block copolymers containing ethylene oxide and propylene oxide, the polyalkylene oxide polymers having molecular weights of 1,000 or more.

10. A formulation as claimed in claim 1, wherein (b) is polyvinylpyrrolidone, a copolymer of N-vinylpyrrolidone and vinyl acetate, a copolymer of styrene, acrylic acid and diethylaminoethyl or dimethylaminoethyl acrylate or methacrylate, a block copolymer of propylene oxide and ethylene oxide, or a reaction product of ethylenediamine with propylene oxide and ethylene oxide.

11. A formulation as claimed in claim 1, wherein (a) is a monoazo dye, a quinophthalone dye, an anthraquinone dye, a dye from other categories of compounds which go onto polyester fibers from an aqueous liquor, or a mixture of the above dyes.

12. The formulation of claim 1, wherein organic solvent is removed by spray drying.

* * * * *

UNITED STATES PATENT AND TRADEMARK OFFICE
CERTIFICATE OF CORRECTION

PATENT NO. : 4,286,959

DATED : Sep. 1, 1981

INVENTOR(S) : DIETER HORN ET AL

It is certified that error appears in the above-identified patent and that said Letters Patent are hereby corrected as shown below:

Please insert the following Priority Data:

[30]--Foreign Application Priority Data

March 21, 1978 [DE] Fed. Rep. of Germany......2812307

Signed and Sealed this

Fifteenth Day of December 1981

[SEAL]

Attest:

GERALD J. MOSSINGHOFF

Attesting Officer

Commissioner of Patents and Trademarks